(12) United States Patent
Jorgensen et al.

(10) Patent No.: US 9,025,296 B2
(45) Date of Patent: May 5, 2015

(54) TRANSIENT VOLTAGE SUPPRESSOR

(75) Inventors: John M. Jorgensen, Los Gatos, CA (US); Sam Kang, Pleasanton, CA (US); Chad N. Marak, Cedar Park, TX (US); James Lu, Hsinchu (TW)

(73) Assignee: Littelfuse, Inc., Chicago, IL (US)

( * ) Notice: Subject to any disclaimer, the term of this patent is extended or adjusted under 35 U.S.C. 154(b) by 338 days.

(21) Appl. No.: 13/344,469

(22) Filed: Jan. 5, 2012

(65) Prior Publication Data

US 2012/0176718 A1   Jul. 12, 2012

Related U.S. Application Data

(60) Provisional application No. 61/430,238, filed on Jan. 6, 2011.

(51) Int. Cl.
*H02H 3/22* (2006.01)
*H02H 9/04* (2006.01)

(52) U.S. Cl.
CPC ..................... *H02H 9/046* (2013.01)

(58) Field of Classification Search
USPC .................... 361/100, 110, 111, 205
See application file for complete search history.

(56) References Cited

U.S. PATENT DOCUMENTS

| | | | |
|---|---|---|---|
| 4,484,244 A | | 11/1984 | Avery |
| 4,633,283 A | * | 12/1986 | Avery ........................... 257/122 |
| 4,876,620 A | | 10/1989 | Borkowicz |
| 5,268,588 A | * | 12/1993 | Marum ......................... 257/362 |
| 5,343,053 A | * | 8/1994 | Avery ............................ 257/173 |
| 5,500,546 A | * | 3/1996 | Marum et al. ................. 257/358 |
| 5,574,618 A | * | 11/1996 | Croft ............................. 361/212 |
| 5,600,525 A | * | 2/1997 | Avery .............................. 361/56 |
| 5,821,572 A | * | 10/1998 | Walker et al. ................. 257/107 |
| 5,856,214 A | * | 1/1999 | Yu ................................. 438/133 |
| 6,130,117 A | * | 10/2000 | Walker et al. ................. 438/133 |
| 6,365,924 B1 | * | 4/2002 | Wang et al. .................... 257/110 |
| 7,217,980 B2 | * | 5/2007 | Chen et al. .................... 257/357 |
| 7,589,944 B2 | * | 9/2009 | Mergens et al. ................ 361/56 |
| 7,633,096 B2 | * | 12/2009 | Song et al. .................... 257/173 |
| 7,985,983 B2 | * | 7/2011 | Russ et al. ..................... 257/173 |
| 8,264,806 B2 | * | 9/2012 | Gehrke .......................... 361/91.1 |
| 2002/0075619 A1 | * | 6/2002 | Maytum et al. ............... 361/91.1 |

(Continued)

OTHER PUBLICATIONS

International Search Report and Written Opinion dated Jul. 18, 2013 from corresponding PCT/US2012/020413 filed Jan. 6, 2012 (five (5) pages).

*Primary Examiner* — Thienvu Tran
*Assistant Examiner* — Angela Brooks
(74) *Attorney, Agent, or Firm* — Kacvinsky Daisak Bluni PLLC

(57) ABSTRACT

A transient voltage suppressor may include a silicon controlled rectifier (SCR) having an anode coupled to Vcc. The SCR may include a PNP transistor (Q2) and an NPN transistor (Q3), the PNP transistor having a base in common with a collector of the NPN transistor and the PNP transistor having a collector in common with a base of the NPN transistor. The TVS may further include a Zener diode having an anode and cathode, wherein the anode is directly coupled to the base of the NPN transistor and/or the cathode is directly coupled to the base of the PNP transistor, and an additional NPN transistor (Q1). The cathode of the SCR may be directly coupled to a base of the additional NPN transistor, and a collector and emitter of the additional NPN transistor may be directly coupled in series between $V_{CC}$ and ground.

12 Claims, 4 Drawing Sheets

(56) References Cited

U.S. PATENT DOCUMENTS

| | | |
|---|---|---|
| 2004/0095698 A1 | 5/2004 | Gerrish |
| 2005/0047042 A1* | 3/2005 | Satou et al. .................. 361/100 |
| 2007/0279824 A1* | 12/2007 | Mallikararjunaswamy .. 361/118 |
| 2009/0052102 A1* | 2/2009 | Wada .............................. 361/56 |
| 2009/0262476 A1* | 10/2009 | Mallikararjunaswamy .... 361/56 |
| 2009/0278168 A1* | 11/2009 | Hwang et al. ................. 257/173 |
| 2012/0275073 A1* | 11/2012 | Tsai et al. ....................... 361/56 |
| 2014/0339601 A1* | 11/2014 | Salcedo et al. ................ 257/140 |

* cited by examiner

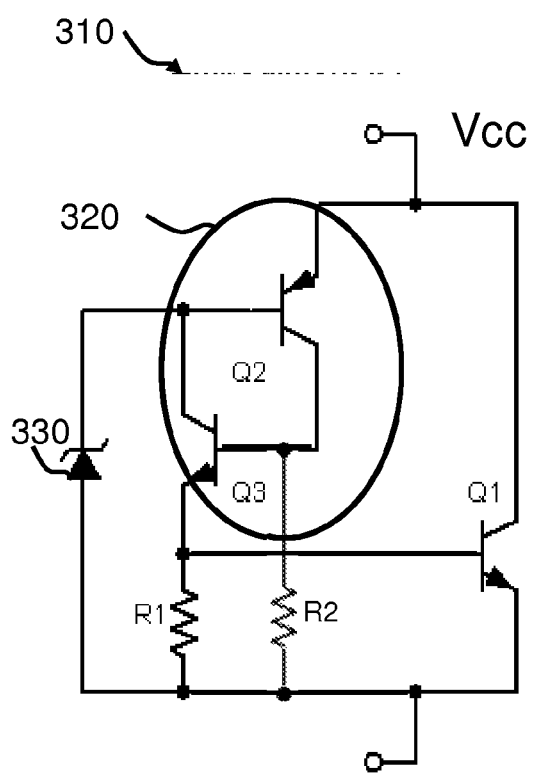 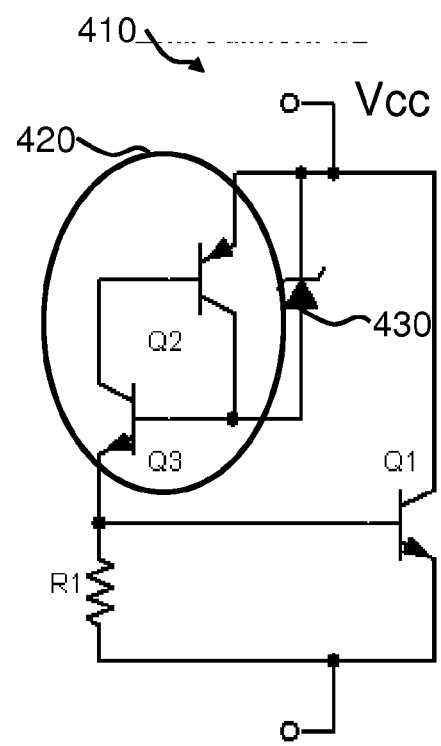
FIG. 3  FIG. 4

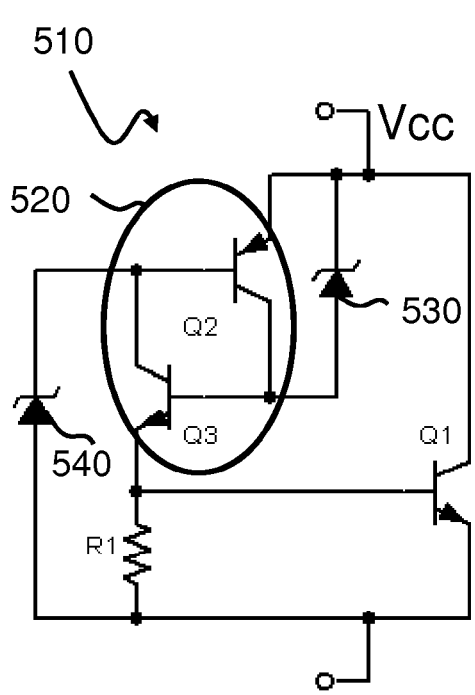 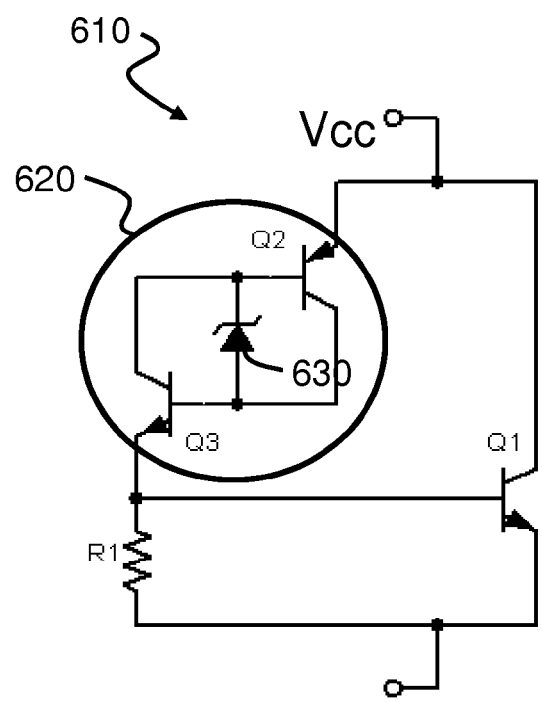
FIG. 5  FIG. 6

TRANSIENT VOLTAGE SUPPRESSOR

FIELD

This application claims priority to U.S. provisional patent application No. 61/430,238 filed Jan. 6, 2011 and incorporated by reference herein in its entirety.

The present disclosure relates to devices and techniques for controlling voltages in electrical or electronic devices.

BACKGROUND

In previous technology generations, integrated circuits (or chipsets) were powered using 5V and could easily withstand voltages up to several volts higher. In order to protect such a chipset against transient high voltage spikes, such as those caused by lightening, known avalanche (or low capacitance steering diodes forming a bridge around such a diode) or Zener diodes have been employed to limit the voltage experienced by the chipset. The typical breakdown or turn-on voltage for transient voltage suppression devices such as the aforementioned Zener or avalanche diodes is in the range of about 5V-8V, making such devices ideal for a chipset driven by a 5V power supply. In a typical transient voltage suppression device, such as a Zener diode, the device breaks down at a fixed and known reverse bias, typically in a reversible manner, such that large current can be born by the diode. Because of the relatively low impedance in the breakdown state, the voltage across the diode "clamps" at a voltage approximately the same as the breakdown voltage, that is, the voltage does not rise substantially, even in the presence of high voltage spikes. A transient voltage suppression device that is integrated into a chipset is thus able to maintain the voltage that the chipset experiences to a value characteristic of the breakdown voltage of the particular transient suppression device.

Although such transient suppression devices may provide adequate protection for chipsets based on 5V power supply technology, as electronic devices scale to smaller dimensions, a concomitant reduction in power supply voltage is useful to fully realize performance benefits afforded by the smaller device dimensions. In turn, the smaller device geometries render electronic components, such as transistors, much more sensitive to voltage, in part because of the higher fields generated at the smaller dimensions. Many present-day chipsets operate at 3.3V, 2.5V, or as low as 1.8V.

This very pronounced decrease in the maximum operating voltage of current day electronics has therefore created a need for an improved Zener/avalanche diode. Thus, a standard 6-8V Zener diode clamps at a much higher voltage level than a chipset designed for 1.8V, 2.5V, or 3.3V operation can withstand, making the standard Zener diode an ineffective protection device. Such a device may still provide some protection for a very short duration (e.g., 100 ns) event such as electrostatic discharge (ESD), but not for longer duration (i.e. >30 μs) events including lightning-induced surges.

Several types of devices have been developed to provide clamping at lower voltages. These include a punch-through vertical NPN transistor that is designed to conduct at relatively low voltage levels by virtue of a very narrow base region. In addition, a 4-layer vertical NPN transistor that is described in U.S. Pat. No. 5,880,511 and U.S. RE 38,608 E. Conventional silicon controlled rectifiers (SCR) may also be used to provide low voltage clamping.

FIG. 1a depicts a schematic of a known vertical NPN transistor 100. In operation, a punch-through vertical NPN transistor, such as transistor 100, has a "programmed" breakdown voltage that is set by the transistor base width. The punch through voltage may be defined as the voltage at which the space charge region of the collector base junction merges with the emitter. At present, the lowest turn-on voltage for such devices is about 2.5V, and the snapback voltage is typically not below 2.0V, in part to limits placed by current device processing technology. Furthermore, the base width in such vertical NPN devices must be designed to be a minimum thickness in order to avoid premature turn-on or leakage at temperature extremes, which adds extra resistance (and thus higher clamping voltage) during a high voltage transient.

FIG. 1b depicts a schematic of a 4-layer device structure 120, as described in U.S. Pat. No. 5,880,511. This structure is achieved using a processing sequence that adds an extra, lightly doped p-type layer in the base, which creates a more effective punch-through transistor, thereby helping to lower the clamping voltage. Additionally, the four layer device 120 has lower leakage currents at voltages just below the turn-on voltage. However, the four layer device also does not provide a breakdown voltage below about 2.5V, with a minimal voltage snapback (i.e. 2V minimum), similar to the NPN vertical punch-through device.

FIG. 1c illustrates a schematic of a known SCR device structure 140 that includes a PNP transistor 150 and NPN transistor 160. In typical implementation, the SCR comprises a four layer P-N-P-N stack. As illustrated, the base of the PNP transistor 150 is shared in common with the emitter of the NPN transistor and the collector of the PNP transistor is in common with the base of the NPN transistor. A gate terminal is connected to the base of the NPN transistor.

At present, SCR devices exist that, when triggered, can clamp to voltages on the order of 1-1.5V, depending upon device size. However, once triggered, an SCR remains in a conducting state until the "holding current" is removed. This value may vary with design and processing parameters, but typically an SCR may remain turned on after an over-voltage event has passed, and thus may interfere in normal operation of the devices and circuits that the SCR is designed to protect. For this reason, SCRs are generally considered to be a non-ideal solution for use as circuit protection devices.

In view of the above, it is apparent that a need exists for transient voltage suppression devices that provide improved protection for devices operating at low power supply voltages.

SUMMARY

In one embodiment, a transient voltage suppressor is provided for protecting components coupled to a power supply configured to provide a supply voltage Vcc. The transient voltage suppressor may include a silicon controlled rectifier (SCR) having an anode coupled to a first terminal configured to supply voltage at Vcc, the silicon controlled rectifier comprising a PNP transistor (Q2) and an NPN transistor (Q3), the PNP transistor having a base in common with a collector of the NPN transistor and the PNP transistor having a collector in common with a base of the NPN transistor. The transient voltage suppressor may further include a Zener diode having an anode and cathode, wherein the anode is directly coupled to the base of the NPN transistor and/or the cathode is directly coupled to the base of the PNP transistor and an additional NPN transistor (Q1), wherein the cathode of the silicon controlled rectifier is directly coupled to a base of the additional NPN transistor, and wherein a collector and emitter of the additional NPN transistor are directly coupled in series between $V_{CC}$ and ground.

In another embodiment, a method of providing transient voltage suppression for protecting components coupled to a power supply configured to provide a supply voltage Vcc may include providing a silicon controlled rectifier (SCR) having an anode coupled to a first terminal configured to supply voltage at Vcc. The silicon controlled rectifier may comprise a PNP transistor (Q2) and an NPN transistor (Q3), the PNP transistor having a base in common with a collector of the NPN transistor and the PNP transistor having a collector in common with a base of the NPN transistor. The method may further include providing a Zener diode having an anode and cathode, wherein the anode is directly coupled to the base of the NPN transistor and/or the cathode is directly coupled to the base of the PNP transistor. The method may also include providing an additional NPN transistor (Q1), wherein the cathode of the silicon controlled rectifier is directly coupled to a base of the additional NPN transistor, and wherein a collector and emitter of the additional NPN transistor are directly coupled in series between $V_{CC}$ and ground.

BRIEF DESCRIPTION OF DRAWINGS

FIG. 3 illustrates an embodiment of a transient voltage suppressor (TVS) connected to a voltage source, which may be used to power at a nominal voltage electronic components to be protected.

FIG. 4 illustrates an alternative embodiment of a transient voltage suppressor.

FIG. 5 illustrates another embodiment of a transient voltage suppressor.

FIG. 6 illustrates a further embodiment of a transient voltage suppressor.

DETAILED DESCRIPTION

Figure 1A:
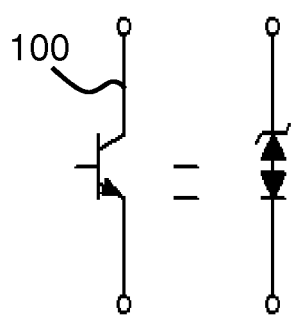
FIG. 1a depicts a schematic of a known vertical NPN transistor.
Figure 1B:
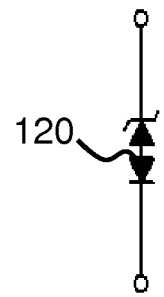
FIG. 1b depicts a schematic of a known 4-layer device structure.
Figure 1C:
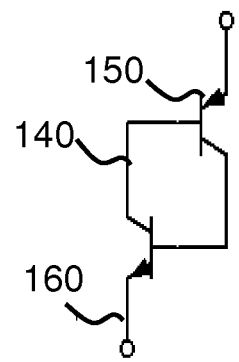
FIG. 1c illustrates a schematic of a known SCR device structure that includes a PNP transistor and NPN transistor.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Embodiments of the present invention employ a novel and inventive arrangement of components to provide a very low voltage clamping circuit that can be integrated into known and future electronic and electrical components to provide protection against transient voltage excursions.

In embodiments of the invention a protection circuit is provided in which one or two Zener/avalanche diodes may be employed to trigger an SCR that then feeds current into the base of a large NPN transistor. The large NPN transistor is arranged so as to clamp the "VCC bus" to a very low voltage. In some embodiments, the clamped voltage may be in the neighborhood of 1V. Once the low voltage level on the VCC bus is established, the SCR does not receive enough voltage to remain in an "on" state, and thereby turns off. Accordingly, the present invention provides a circuit that affords both overvoltage protection for devices designed to operate at low voltages and an automatic shut-off of an SCR that is used as part of the overvoltage protection circuit.

Figure 2:
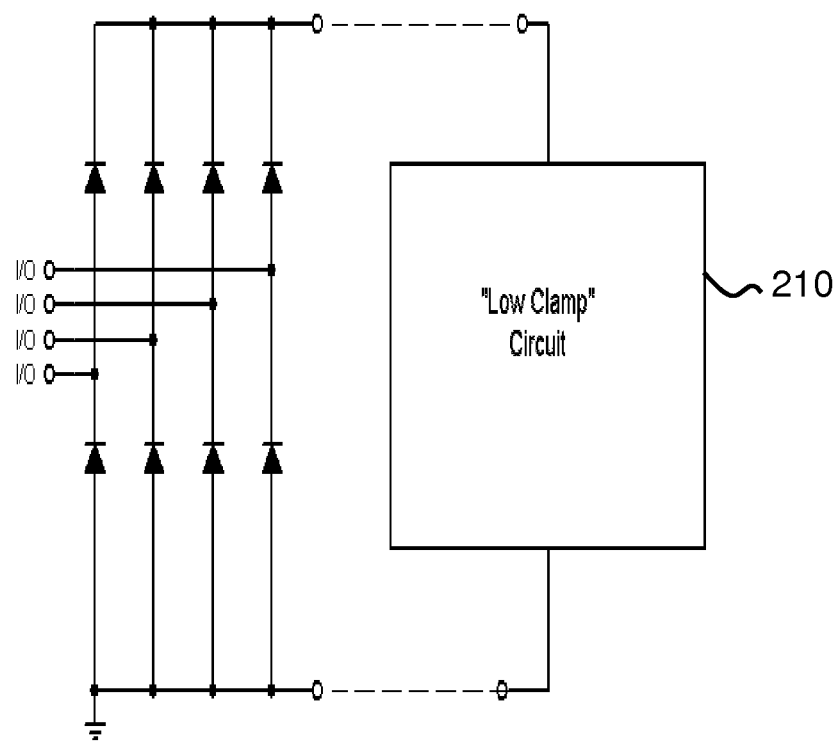
FIG. 2 illustrates a general circuit arrangement including a low clamping voltage circuit arranged in accordance with the present invention.

FIG. 2 illustrates a general circuit arrangement 200 including a low clamping voltage circuit (also termed a "transient voltage suppressor") 210, arranged in accordance with the present invention. In some embodiments, the circuit may be used as a standalone device or as a part of diode bridge. As used herein, the term "transient voltage suppressor" refers to a circuit used to suppress an overvoltage event and is synonymous with the term "low clamping voltage circuit." In the discussion to follow, several embodiments of low clamping voltage circuit 210 are set forth. Each embodiment provides a circuit that is configured to clamp to a low voltage upon receiving a voltage spike, using an SCR in conjunction with one or more Zener diodes, and is configured to automatically shut the SCR off. The circuits of the present invention may advantageously provide an arrangement that clamps to low voltage in response to various types of overvoltage conditions, for example, a voltage surge from lightning that occurs on the order of many microseconds, and an electrostatic discharge that occurs on the order of a nanosecond, or other types of overvoltage events.

FIGS. 3-6 illustrate alternative embodiments of a transient voltage suppressor (TVS) connected to a voltage source, which may be used to power at a nominal voltage Vcc electronic components to be protected (not shown). The TVS devices disclosed in FIGS. 3-6 each include one or more Zener diodes that are arranged to trigger an SCR device after receiving a high voltage pulse. Current from the SCR device then turns on a large NPN transistor that continues to conduct current at a very low voltage level, such as about 1V. In each figure, the PNP and NPN devices that comprise an SCR are labeled as Q2 and Q3, respectively, and a further NPN transistor is referred to as Q1. In some embodiments of the invention, transistor Q1 may have the same properties for each arrangement depicted in FIGS. 3-6, transistor Q2 may have the same properties for each arrangement depicted in FIGS. 3-6, and transistor Q3 may have the same properties for each arrangement depicted in FIGS. 3-6. However, it is to be noted that the exact properties and structure of components Q2, Q3, and Q1 may vary between embodiments. Other differences among the embodiments shown in FIGS. 3-6 are the arrangement of Zener/avalanche diodes with respect to a given SCR. In each figure, the Zener diode and SCR are mutually arranged in a different manner than in each other figure.

FIG. 3 depicts a transient voltage suppressor 310 according to an embodiment of the invention. In this embodiment, SCR 320 comprises PNP transistor Q2 and NPN transistor Q3. The anode of SCR 320 is connected to an external voltage source that is configured to supply a voltage Vcc. A Zener diode 330 is arranged such that its cathode forms a common connection to the collector of Q3 and base of Q2. A NPN transistor Q1 is arranged with its collector and emitter arranged in series with $V_{CC}$ and ground, such that, when turned on, Vcc is equal to voltage from any series resistance in the device plus the collector-emitter voltage $V_{CE,Q1}$. The emitter of Q3 is connected to the base of Q1. A resistor R1 is also provided between the emitter of Q3 and ground.

In accordance with the present invention, TVS 310 limits the voltage experienced by protected components when a transient overvoltage propagates towards TVS 310. In examples of the invention, Zener diode 330 may be configured with a breakdown voltage of about 3-8 volts, and in particular, about 7 volts. Circuit 310 may be triggered to provide overvoltage protection in response to an electrostatic discharge (ESD) event, which may cause, for example, a transient voltage rise over a period on the order of about a nanosecond or more, or a voltage surge that takes place on the order of microseconds.

In the circuit arrangement of circuit 310, Zener diode 330 and the base/emitter junction of PNP transistor Q2 are arranged in series between $V_{CC}$ and ground. Accordingly, when the transient voltage exceeds a threshold equal to the sum of the breakdown voltage $V_{BZ}$ for Zener diode 330 and the base/emitter forward voltage $V_{BEQ2}$ for transistor Q2, the Zener diode 330 may experience breakdown, leading to a substantial current flowing through Zener diode 330. This threshold may be on the order of about 5-10 volts for configurations of the invention in which the Zener diode has a breakdown voltage of about 3-8 V, and for PNP diodes having a forward voltage between base and emitter on the order of 0.6 V. Current thereby flows into the base of transistor Q2, which triggers the SCR 320 to turn on. Current is thereby fed into the base of transistor Q3 of SCR 320, and current also flows out through the emitter of Q3. Current flowing from the emitter of Q3 may be fed to the base of large NPN transistor Q1, triggering Q1 to conduct current between its collector and emitter.

Once the large NPN transistor Q1 turns on, the voltage experienced across SCR 320 may be brought to a sufficiently low voltage level to turn off SCR 320. For example, Q1 may be configured such that a saturation voltage across $V_{CE}$ may be on the order of 0.3V. The voltage level that circuit 310 clamps to may therefore be a value of approximately the saturation voltage across Q1 $V_{CEQ1}$ plus the voltage drop induced by the series resistance of Q1. This clamping voltage may be about 1V or less.

Because the Zener diode 330 of circuit 310 is connected to $V_{CC}$ through the base/emitter junction of transistor Q2, Zener diode 330 may experience full breakdown before SCR 320 turns on. Accordingly, circuit 310 can respond to an ESD event on the order of the response time of the Zener diode, which may be on the order of nanoseconds. Circuit 310 may therefore be advantageously used in response to an ESD event in order to shunt current away from protected components in a substrate that includes circuit 310. In addition, circuit 310 may be effective in protecting devices from a longer acting surge event that may take place over microseconds or longer duration. In particular, once large NPN Q1 is turned on, relatively larger currents that may result from a surge event of microseconds or longer duration may be shunted through Q1.

In the embodiment depicted in FIG. 3, resistor R1 may act to facilitate operation of circuit 310 by shunting current to ground. A second resistor R2 is connected between the base of Q3 and ground (also shown in the circuit arrangements of FIGS. 4-6), which may help ensure that Q1 and Q3 go into an off state after the transient condition has dissipated.

FIG. 4 depicts a transient voltage suppressor 410 according to another embodiment of the invention. In this embodiment, SCR 420 may be the same as SCR 320. Zener diode 430, which may be the same as Zener diode 330, is arranged such that its cathode connects to Vcc and its anode forms a common connection to the collector of Q2 and base of Q3. A NPN transistor Q1 is arranged with its collector and emitter connected in series between $V_{CC}$ and ground, such that, when turned on, Vcc is equal to the voltage drop induced by the series resistance of Q1 plus the collector-emitter voltage $V_{CE,Q1}$. As in the arrangement of FIG. 3, the emitter of Q3 is connected to the base of Q1.

The TVS 410 of FIG. 4 operates similarly to TVS 310 of FIG. 3 in that an SCR (SCR 420) is triggered into an "on" state in response to an overvoltage and thereby feeds current from the SCR cathode (NPN emitter) to the base of a large NPN transistor Q1. One difference in TVS 410 with respect to TVS 310 is that the anode of Zener diode 430 is connected, not to ground, but to the base of NPN transistor Q3 of SCR 420. Thus, SCR is triggered through the base of Q3 as opposed to the triggering of SCR 310, which occurs via the base of Q2. Accordingly, the response time of low clamping voltage circuit 410 is limited by the response time to turn on SCR 420, which may be much greater than the Zener diode breakdown time.

In accordance with the present invention, TVS 410 limits the voltage experienced by protected components when a transient overvoltage propagates towards TVS 410. In one example of the invention, Zener diode 430 may be configured with a breakdown voltage in the range of about 3-8V. Accordingly, if a voltage transient is received at the cathode of Zener diode 430 that exceeds a threshold equal to the sum of the breakdown voltage $V_{BZ}$ for Zener diode 430 and the base emitter forward voltage $V_{BEQ3}$ for transistor Q3 and a small voltage across R1, $V_{R1}$, breakdown is induced, which limits the voltage across the diode to the breakdown voltage.

The current flowing through the base of Q3 thereby triggers SCR 420 into an "on" state. Current then flows through the base of Q2, turning on Q2, which thereby continues to feed the base of Q3. While SCR 430 is in the "on" state, current flowing from the emitter of Q3 may feed into the base of Q1, causing current to flow between the collector and emitter of Q1. Again, the voltage between $V_{CC}$ can be thereby brought down to a level that shuts off SCR 430.

FIG. 5 depicts a transient voltage suppressor 510 according to another embodiment of the invention. In this embodiment, SCR 520 may be the same as SCR 320 and/or SCR 420. Zener diode 530, which may be the same as Zener diode 330 and/or Zener diode 430, is arranged such that its cathode connects to Vcc and its anode forms a common connection to the collector of Q2 and base of Q3. A second Zener diode 540 is arranged with its cathode connected to the base of PNP transistor Q2 and the collector of Q3. A low voltage NPN transistor Q1 is arranged with its collector and emitter connected to the power supply, such that, when turned on, Vcc is equal to the collector-emitter voltage $V_{CE,Q1}$. As in the arrangement of FIGS. 3 and 4, the emitter of Q3 is connected to the base of Q1.

In accordance with the present invention, TVS 510 limits the voltage experienced by protected components when a transient overvoltage propagates towards TVS 510. In one example of the invention, Zener diodes 530 and 540 may be configured with a breakdown voltage in the range of about 3-8V. Accordingly, when the transient voltage exceeds a threshold equal to the sum of the breakdown voltage $V_{BZ}$ for Zener diode 540 and the base emitter forward voltage $V_{BEQ2}$ for transistor Q2, the Zener diode 540 may experience breakdown, leading to a substantial current flowing through Zener diode 540.

The current fed to the base of PNP transistor Q2 may thereby trigger SCR 520 into an "on" state.

While SCR 520 is in the "on" state, current flowing from the emitter of Q3 feeds into the base of Q1, causing current to flow between the collector and emitter of Q1.

As with TVS 310, TVS 510 provides a fast response time, inasmuch as Zener diode 540 is connected to $V_{CC}$ through the base/emitter junction of transistor Q2. Accordingly, current may flow through Zener diode 540 before SCR 520 turns on.

Additionally, in TVS 510 Zener diode 530 may breakdown and trigger SCR 520 by feeding current to the base of transistor Q3. Both Zener diodes 530 and 540 may trigger at about the same time. Initial current may pass through both transistors Q2 and Q3 simultaneously, thereby turning on SCR 520 more quickly. Zener diode 530 may aid in charging up the large base/emitter capacitance of transistor Q1, thereby providing a quicker turn-on for transistor Q1 as compared to TVS 310 and 410.

FIG. 6 depicts a transient voltage suppressor 610 according to an embodiment of the invention. In this embodiment, SCR 620 may be the same as any or all of SCRs 320, 420, 520 discussed previously. Zener diode 630, which may be the same as any or all of Zener diodes 330, 430, 530, or 540 is arranged such that its cathode connects in common the base of PNP transistor Q2 and collector of Q3, and its anode forms a common connection to the collector of Q2 and base of Q3. A NPN transistor Q1 is arranged with its collector and emitter connected to the power supply, such that, when turned on, Vcc is equal to the collector-emitter voltage $V_{CE,Q1}$. As in the arrangement of FIGS. 3, 4 and 5, the emitter of Q3 is connected to the base of Q1.

In accordance with the present invention, TVS 610 limits the voltage experienced by protected components when a transient occurs. In particular, when the voltage exceeds the breakdown voltage of Zener diode 630, the SCR may begin to turn on. Initial current may pass through both transistors Q2 and Q3 simultaneously, thereby aiding in turning on the SCR 620 more quickly.

In summary, in the present invention, including the configurations depicted in FIGS. 3-6, a low clamping voltage circuit (TVS) is provided. After turning on via input from an SCR, an NPN transistor Q1 of the TVS may be configured to operate at low collector-emitter voltage $V_{CE,Q1}$, such that the total voltage on the $V_{CC}$ bus is low enough to cause the SCR to automatically turn off. The clamping voltage for transistor Q1 is based upon Q1's saturation voltage ($V_{CE}$), which is roughly 0.3V, plus the voltage drop due to Q1's series resistance. In turn, and in accordance with the present invention, the series resistance can be minimized by proper design of the device, such as design of device size.

In particular, in embodiments of the present invention, transistors Q1-Q3 are mutually designed so that the collector-emitter voltage on transistor Q1 is sufficiently low that the associated SCR(s) are no longer supplied with sufficient voltage to remain on, and thereby turn off. This automatic shutoff feature can be brought about so long as transistors Q1-Q3 are designed to meet one of the following conditions: the collector-emitter voltage on transistor Q1, $V_{CE,Q1}$, is less than $V_{CE,Q2}+V_{BE,Q3}$, where $V_{CE,Q2}$ is the collector-emitter voltage on transistor Q2, and $V_{BE,Q3}$ is the base-emitter forward voltage on transistor Q3; or 2) $V_{CE,Q1} < V_{BE,Q2}+V_{CE,Q3}$ where $V_{BE,Q2}$ is the base-emitter forward voltage on transistor Q2, and $V_{CE,Q3}$ is the collector-emitter voltage on transistor Q3. These conditions may be met by proper design of transistors Q1-Q3 plus the value of resistors to ground from base of Q1 and base of Q3, as noted.

The present invention thus provides the following features. A transient voltage suppressor is provided that is based on combination of devices arranged in a circuit comprising an SCR, a large NPN transistor, and at least one Zener diode. The TVS of the present invention is configured to clamp at much lower voltages than single device structures, such as the prior art four layer transistor and the prior art vertical NPN punch through device. The TVS of the present invention also is configured to automatically turn off an SCR after an overvoltage event has passed. In some embodiments the circuit arrangement of the TVS may be optimized to provide protection to both fast ESD events and slower surges, such as lightning induced surges.

The present invention is not to be limited in scope by the specific embodiments described herein. Indeed, other various embodiments of and modifications to the present disclosure, in addition to those described herein, will be apparent to those of ordinary skill in the art from the foregoing description and accompanying drawings. For example, avalanche diodes may be used in place of the Zener diodes of the embodiments disclosed herein. Thus, such other embodiments and modifications are intended to fall within the scope of the present disclosure. Further, although the present invention has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A transient voltage suppressor for protecting components coupled to a power supply configured to provide a supply voltage Vcc, the transient voltage suppressor comprising:
 a silicon controlled rectifier (SCR) having an anode coupled to a first terminal configured to supply voltage at Vcc, the silicon controlled rectifier comprising a PNP transistor (Q2) and an NPN transistor (Q3), the PNP transistor Q2 having a base in common with a collector of the NPN transistor Q3 and the PNP transistor having a collector in common with a base of the NPN transistor Q3;
 a Zener diode having an anode and cathode, wherein the anode is directly coupled to the base of the NPN transistor Q3 and the collector of the PNP transistor Q2, and the cathode is coupled with Vcc; and
 an additional NPN transistor (Q1), wherein the cathode of the SCR is coupled to a base of the additional NPN transistor Q1, and wherein a collector and emitter of the additional NPN transistor Q1 are coupled in series between Vcc and ground; and
 a second Zener diode arranged with its cathode coupled in common to the base of the PNP transistor Q2 and the collector of the NPN transistor Q3.

2. The transient voltage suppressor of claim 1, wherein transistors Q1-Q3 are mutually configured such that:

$$V_{CE,}Q^1, < V_{CE,}Q^2 + V_{BE,}Q^3, \text{ or}$$

$$V_{CE,}Q^1 < V_{BE,}Q^2 + V_{CE,}Q^3,$$

where $V_{CE}$, $Q^1$ is the collector-emitter saturation voltage on transistor Q1,
$V_{CE},Q^2$ is the collector-emitter voltage on transistor Q2,
$V_{BE},Q^3$ is the base-emitter forward voltage on transistor Q3,
$V_{BE},Q^2$ is the base-emitter forward voltage on transistor Q2, and
$V_{CE},Q^3$ is the collector-emitter voltage on transistor Q3.

3. The transient voltage suppressor of claim 1, wherein the Zener diode is configured to trigger the SCR after receiving a high voltage pulse.

4. The transient voltage suppressor of claim 3, wherein current from the triggered SCR is arranged to turn on Q1.

5. The transient voltage suppressor of claim 4, wherein Q1 is arranged to conduct current at a voltage level of about 1V.

6. The transient voltage suppressor of claim 4, wherein collector-emitter voltage on Q1 is sufficiently low after turn-on of Q1 to trigger the SCR to turn off.

7. The transient voltage suppressor of claim 1, wherein the cathode of the Zener diode forms a common connection to the collector of Q1 and an emitter of Q2.

8. The transient voltage suppressor of claim 1, wherein the anode of the second Zener diode is coupled with the emitter and base of Q1 and the emitter of Q3.

9. A method of providing transient voltage suppression for protecting components coupled to a power supply configured to provide a supply voltage Vcc, comprising:

providing a silicon controlled rectifier (SCR) having an anode coupled to a first terminal configured to supply voltage at Vcc, the silicon controlled rectifier comprising a PNP transistor (Q2) and an NPN transistor (Q3), the PNP transistor Q2 having a base in common with a collector of the NPN transistor Q3 and the PNP transistor Q2 having a collector in common with a base of the NPN transistor Q3;

providing a Zener diode having an anode and cathode, wherein the anode is coupled to the base of the NPN transistor Q3 and the collector of the PNP transistor Q2, and the cathode is coupled with Vcc;

providing a second Zener diode arranged with its cathode coupled in common to the base of the PNP transistor Q2 and the collector of the NPN transistor Q3; and providing an additional NPN transistor (Q1), wherein the cathode of the SCR is coupled to a base of the additional NPN transistor, and wherein a collector and emitter of the additional NPN transistor are coupled in series between Vcc and ground, wherein when Q1 is turned on, Q1 to conduct current at a voltage level of about 1V.

10. The method claim 9, further comprising: receiving a high voltage pulse; and triggering the SCR using the Zener diode.

11. The method of claim 10, further comprising feeding current from the triggered SCR to turn on Q1.

12. The method of claim 11, comprising configuring collector-emitter voltage of Q1 after turn-on of Q1 to trigger the SCR to turn off.

* * * * *